United States Patent
Cheng et al.

(10) Patent No.: US 8,289,679 B2
(45) Date of Patent: Oct. 16, 2012

(54) DECOUPLING DEVICE

(75) Inventors: Cheng-Liang Cheng, Hsinchu (TW); Chi-Lun Chen, Taipei (TW); Li-Duan Tsai, Hsinchu (TW); Min-Lin Lee, Hsinchu (TW); Shur-Fen Liu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 369 days.

(21) Appl. No.: 12/776,442

(22) Filed: May 10, 2010

(65) Prior Publication Data

US 2011/0157775 A1    Jun. 30, 2011

(30) Foreign Application Priority Data

Dec. 30, 2009   (TW) ................................ 98145811 A

(51) Int. Cl.
*H01G 5/38*   (2006.01)
*H01G 9/00*   (2006.01)
(52) U.S. Cl. ........................................ 361/541; 361/523
(58) Field of Classification Search .................. 361/541, 361/532, 528, 523
See application file for complete search history.

(56) References Cited

U.S. PATENT DOCUMENTS

| | | | |
|---|---|---|---|
| 5,973,907 A | 10/1999 | Reed | |
| 6,646,523 B2 | 11/2003 | Arai et al. | |
| 7,460,359 B2 * | 12/2008 | Sakata et al. | 361/528 |
| 7,468,882 B2 * | 12/2008 | Marek et al. | 361/540 |
| 7,898,795 B2 * | 3/2011 | Kasuga et al. | 361/523 |
| 2007/0211414 A1 | 9/2007 | Pelcak et al. | |

FOREIGN PATENT DOCUMENTS

| | | | |
|---|---|---|---|
| JP | 05291085 A | * | 11/1993 |
| JP | 2007-180327 | | 7/2007 |
| JP | 2008-103447 | | 5/2008 |

* cited by examiner

*Primary Examiner* — Eric Thomas
(74) *Attorney, Agent, or Firm* — Jianq Chyun IP Office

(57) ABSTRACT

A decoupling device includes a lead frame, a capacitor unit, a metal layer, and a high dielectric organic-inorganic composite material layer. The lead frame includes a cathode terminal portion and an anode terminal portion. The capacitor unit is disposed on the lead frame. The capacitor unit includes a cathode portion, an anode portion, and an insulation portion located between the cathode portion and the anode portion. The cathode portion is electrically connected to the cathode terminal portion, and the anode portion is electrically connected to the anode terminal portion. The high dielectric organic-inorganic composite material layer is connected to the capacitor unit in parallel via the metal layer.

38 Claims, 5 Drawing Sheets

DECOUPLING DEVICE

CROSS-REFERENCE TO RELATED APPLICATION

This application claims the priority benefit of Taiwan application serial no. 98145811, filed on Dec. 30, 2009. The entirety of the above-mentioned patent application is hereby incorporated by reference herein and made a part of specification.

BACKGROUND OF THE INVENTION

1. Field of the Invention

The invention relates to a decoupling device. More particularly, the invention relates to a broadband decoupling device.

2. Description of Related Art

A solid electrolyte capacitor having advantages of small size, large capacitance, and satisfactory frequency characteristics can be applied for fabricating a decoupling device of a power circuit in a central processing unit (CPU).

Nevertheless, a normal solid electrolyte capacitor can merely filter noise with low frequency. With the gradual increase in processing frequency of the CPU, the resonance frequency of the solid electrolyte capacitor is raised at a high frequency operation condition (10 MHz or higher). Thereby, noise with high frequency is generated, which is detrimental to operation of the CPU.

US patent publication No. 2007/0211414 A1 has disclosed a capacitor assembly in which an individual tantalum solid electrolyte capacitor and an individual multilayered ceramic capacitor (MLCC) are assembled, such that a decoupling device for decoupling within a broadband environment can be formed. However, the capacitor assembly occupies significant space, thus hindering development of the light, thin, small, and compact decoupling device.

SUMMARY OF THE INVENTION

In view of the above, the invention is directed to a decoupling device having a simple structure, small volume, and electrical properties of regulated voltages and high frequency filters.

In the invention, a decoupling device including a lead frame, a capacitor unit, a metal layer, and a high dielectric organic-inorganic composite material layer is provided. The lead frame includes a cathode terminal portion and an anode terminal portion. The capacitor unit is disposed on the lead frame. The capacitor unit includes a cathode portion, an anode portion, and an insulation portion located between the cathode portion and the anode portion. The cathode portion is electrically connected to the cathode terminal portion, and the anode portion is electrically connected to the anode terminal portion. The high dielectric organic-inorganic composite material layer is connected to the capacitor unit in parallel via the metal layer.

According to an embodiment of the invention, the capacitor unit and the high dielectric organic-inorganic composite material layer are disposed at the same side of the cathode terminal portion, the cathode portion of the capacitor unit is disposed on the cathode terminal portion, and the high dielectric organic-inorganic composite material layer is disposed on the cathode portion of the capacitor unit.

According to an embodiment of the invention, the capacitor unit and the high dielectric organic-inorganic composite material layer are disposed at opposite sides of the cathode terminal portion. The cathode portion of the capacitor unit is disposed at one side of the cathode terminal portion, and the high dielectric organic-inorganic composite material layer is disposed at the other side of the cathode terminal portion.

In the invention, a decoupling device including a lead frame, a capacitor unit, a metal layer, and a high dielectric organic-inorganic composite material layer is further provided. The lead frame includes a cathode terminal portion, a first anode terminal portion, and a second anode terminal portion. The first anode terminal portion and the second anode terminal portion are located at two sides of the cathode terminal portion. The capacitor unit is disposed on the lead frame. The capacitor unit includes a cathode portion, a first anode portion, and a second anode portion. The first anode portion and the second anode portion are located at two sides of the cathode portion. The first anode portion is electrically connected to the first anode terminal portion, the second anode portion is electrically connected to the second anode terminal portion, and the cathode portion is electrically connected to the cathode terminal portion. The high dielectric organic-inorganic composite material layer is disposed on the cathode portion. Here, the high dielectric organic-inorganic composite material layer is connected to the capacitor unit in parallel via the metal layer.

In the invention, a decoupling device including a lead frame, a first capacitor unit, a second capacitor unit, and a high dielectric organic-inorganic composite material layer is further provided. The lead frame includes a cathode terminal portion, a first anode terminal portion, and a second anode terminal portion. The first anode terminal portion and the second anode terminal portion are located at two sides of the cathode terminal portion. The first capacitor unit is disposed on the lead frame. The first capacitor unit includes a first cathode portion and a first anode portion. The first anode portion is electrically connected to the first anode terminal portion, and the first cathode portion is electrically connected to the cathode terminal portion. The second capacitor unit is disposed on the first capacitor unit. The second capacitor unit includes a second cathode portion and a second anode portion. The second anode portion is electrically connected to the second anode terminal portion, and the second cathode portion is electrically connected to the first cathode portion. The high dielectric organic-inorganic composite material layer is connected to the first capacitor unit and the second capacitor unit in parallel.

According to an embodiment of the invention, the high dielectric organic-inorganic composite material layer is disposed on the second cathode portion.

According to an embodiment of the invention, the decoupling device further includes a metal layer disposed on the high dielectric organic-inorganic composite material layer. The decoupling device can further include a conductive line connecting the first anode terminal portion and the second anode terminal portion. The conductive line is disposed in an inner space formed by the cathode terminal portion and electrically insulated from the cathode terminal portion.

According to an embodiment of the invention, the decoupling device can have no metal layer but have a conductive line connecting the first anode terminal portion and the second anode terminal portion. The conductive line is disposed in an inner space formed by the cathode terminal portion and electrically insulated from the cathode terminal portion. The high dielectric organic-inorganic composite material layer is disposed on the conductive line. The cathode terminal portion is disposed on the high dielectric organic-inorganic composite material layer. The first capacitor unit and the second capacitor unit are stacked on the cathode terminal portion.

Based on the above, the high dielectric organic-inorganic composite material layer is integrated into the solid electrolyte capacitor in this invention, so as to form the decoupling device having small size, simple structure, and electrical properties of regulated voltages and high frequency filters. Multiple layers of capacitor units can be stacked in the decoupling device based on different design demands. In addition, the metal layer can act as an electromagnetic shielding layer, so as to effectively reduce electromagnetic interference from external surroundings.

It is to be understood that both the foregoing general descriptions and the following detailed embodiments are exemplary and are, together with the accompanying drawings, intended to provide further explanation of technical features and advantages of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the invention, the high dielectric organic-inorganic composite material layer is integrated into the solid electrolyte capacitor, so as to form a novel decoupling device. The decoupling device is not only characterized by the small size and the simple structure but also by the electrical properties of regulated voltages and high frequency filters. Several embodiments are enumerated hereinafter to describe the structure and the characteristics of the decoupling device of the invention.

First Embodiment

Figure 1:
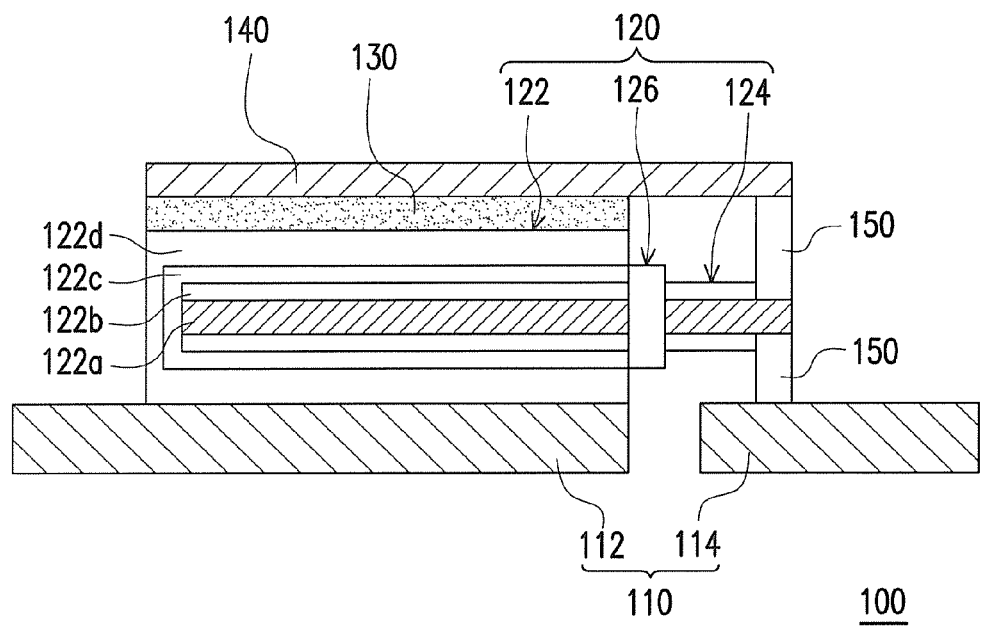
FIG. 1 is a schematic view illustrating a decoupling device according to a first embodiment of the invention.

FIG. 1 is a schematic view illustrating a decoupling device according to a first embodiment of the invention. The decoupling device 100 is a two-terminal type decoupling device. As indicated in FIG. 1, the decoupling device 100 includes a lead frame 110, a capacitor unit 120, a high dielectric organic-inorganic composite material layer 130, and a metal layer 140. The lead frame 110 includes a cathode terminal portion 112 and an anode terminal portion 114. The capacitor unit 120 is disposed on the lead frame 110. The capacitor unit 120 includes a cathode portion 122, an anode portion 124, and an insulation portion 126 located between the cathode portion 122 and the anode portion 124. The cathode portion 122 is electrically connected to the cathode terminal portion 112, and the anode portion 124 is electrically connected to the anode terminal portion 114. The high dielectric organic-inorganic composite material layer 130 is connected to the capacitor unit 120 in parallel via the metal layer 140.

Since the high dielectric organic-inorganic composite material layer 130 and the capacitor unit 120 are connected in parallel, the decoupling device 100 can have the electrical properties of regulated voltages (caused by the capacitance provided by the capacitor unit 120) and high frequency filters (caused by the capacitance provided by the high dielectric organic-inorganic composite material layer 130).

To be more specific, a material of the high dielectric organic-inorganic composite material layer 130 can be a mixture of a polymer material and a ceramic material. Besides, the material of the high dielectric organic-inorganic composite material layer 130 can further include a conductive material. Namely, in accordance with design demands, the conductive material can be added to the mixture of the polymer material and the ceramic material.

The ceramic material can be barium titanate, zirconium titanate, strontium titanate, lead zirconium titanate (PZT), barium strontium titanium zirconium ceramics ($(Ba,Sr)(Ti,Zr)O_3$, BSTZ) or a combination thereof. The polymer material can be thermosetting polymer, such as epoxy resin, polyacrylic acid, polyimide, polyetherimide, or a combination thereof. The conductive material can be carbon black, natural graphite, artificial graphite, silver powder, carbon fiber, or a combination thereof. As such, the high dielectric organic-inorganic composite material layer 130 can be equipped with properties of high dielectric constant.

A dielectric constant of the high dielectric organic-inorganic composite material layer 130 ranges from 10 to 2,000 at a frequency of 1 MHz, for example. Besides, a thickness of the high dielectric organic-inorganic composite material layer 130 can be adjusted, such that the high dielectric organic-inorganic composite material layer 130 can have sufficient capacitance. Preferably, the thickness of the high dielectric organic-inorganic composite material layer 130 ranges from 10 nm to 10 μM.

As shown in FIG. 1, the cathode portion 122 of the capacitor unit 120 can include a valve metal layer 122a, a dielectric layer 122b, a solid electrolyte layer 122c, and a conductive layer 122d. The dielectric layer 122b is formed on the valve metal layer 122a. The solid electrolyte layer 122c is formed on the dielectric layer 122b. The conductive layer 122d is formed on the solid electrolyte layer 122c.

The valve metal layer 122a is made of aluminum, tantalum, titanium, niobium, or an alloy thereof, for example. The valve metal layer 122a is made of metallic materials of which oxide is used to form the dielectric layer 122b. For instance, when the valve metal layer 122a is made of aluminum, the dielectric layer 122b is made of aluminum oxide. Certainly, the dielectric layer 122b can also be made of other dielectric materials. The solid electrolyte layer 122c is made of conductive polymer. The conductive layer 122d is made of adhesive of mixed silver and carbon. In an alternative, the conductive layer 122d has a double-layered structure containing carbon and silver. Descriptions of the materials of the layers provided above are merely exemplary, and various modifications and variations can be made to the materials of the layers by people having ordinary skill in the art. Such modifications and variations do not depart from the scope or the spirit of the invention.

The decoupling device 100 can further include the metal layer 140 disposed on the high dielectric organic-inorganic composite material layer 130. The metal layer 140 not only connects the capacitor unit 120 to the high dielectric organic-inorganic composite material layer 130 in parallel but also acts as an electromagnetic shielding layer of the decoupling device 100 for reducing external electromagnetic interference.

The decoupling device 100 can further include a spacer 150 disposed between the anode portion 124 of the capacitor unit 120 and the metal layer 140 and between the anode portion 124 of the capacitor unit 120 and the anode terminal portion 114. The spacer 150 can compensate for height difference between the anode portion 124 of the capacitor unit 120 and the anode terminal portion 114, so as to stabilize the decoupling device 100.

The spacer 150 can be made of an insulation material or a conductive material based on the design demands. In particular, when the spacer 150 is made of the insulation material, the anode portion 124 can be electrically connected to the anode terminal portion 114 in other manner (e.g. wire bonding). By contrast, when the spacer 150 is made of the conductive material, the spacer 150 itself can electrically connect the anode portion 124 to the anode terminal portion 114.

In the decoupling device 100 shown in FIG. 1, the capacitor unit 120 and the high dielectric organic-inorganic composite material layer 130 are disposed at the same side of the cathode terminal portion 112. The cathode portion 122 of the capacitor unit 120 is disposed on the cathode terminal portion 112, and the high dielectric organic-inorganic composite material layer 130 is disposed on the cathode portion 122 of the capacitor unit 120. That is to say, the decoupling device 100 depicted in FIG. 1 connects the dielectric organic-inorganic composite material layer 130 to the capacitor unit 120 in parallel at the same side of the cathode terminal portion 112.

Figure 2:
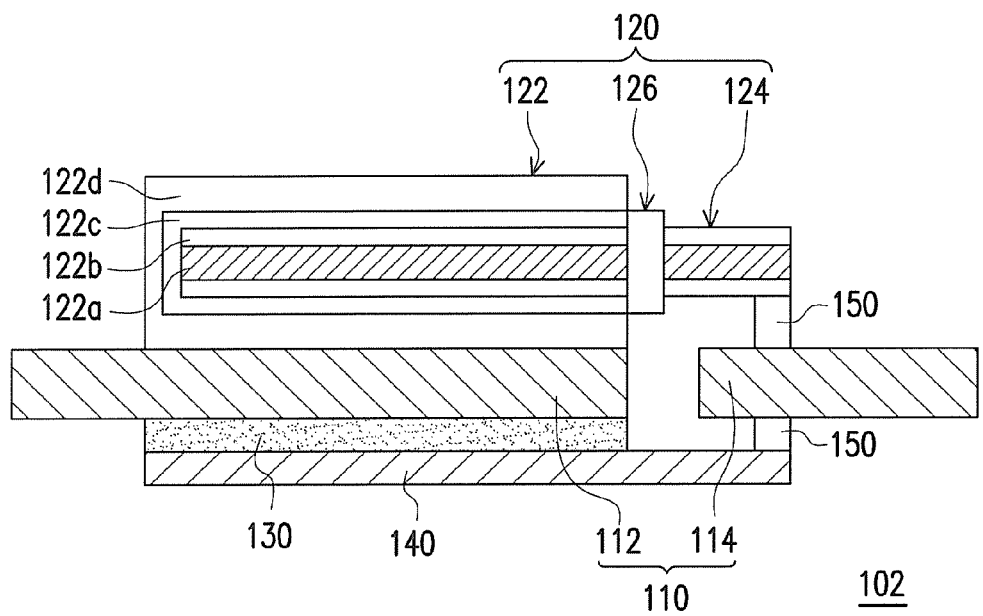
FIG. 2 is a schematic view illustrating another decoupling device according to the first embodiment of the invention.

However, the decoupling device 100 depicted in FIG. 2 can connect the dielectric organic-inorganic composite material layer 130 to the capacitor unit 120 in parallel at different sides of the cathode terminal portion 112. FIG. 2 is a schematic view illustrating another decoupling device according to the first embodiment of the invention. The decoupling device 102 depicted in FIG. 2 is similar to the decoupling device 100 depicted in FIG. 1. Hence, same components of the decoupling device 102 and the decoupling device 100 are labeled by the same reference numbers, and no further descriptions are provided herein.

In the decoupling device 102 shown in FIG. 2, the capacitor unit 120 and the high dielectric organic-inorganic composite material layer 130 are disposed at opposite sides of the cathode terminal portion 112. The cathode portion 124 of the capacitor unit 120 is disposed at one side of the cathode terminal portion 112, while the high dielectric organic-inorganic composite material layer 130 is disposed at the other side of the cathode terminal portion 112.

Second Embodiment

Figure 3:
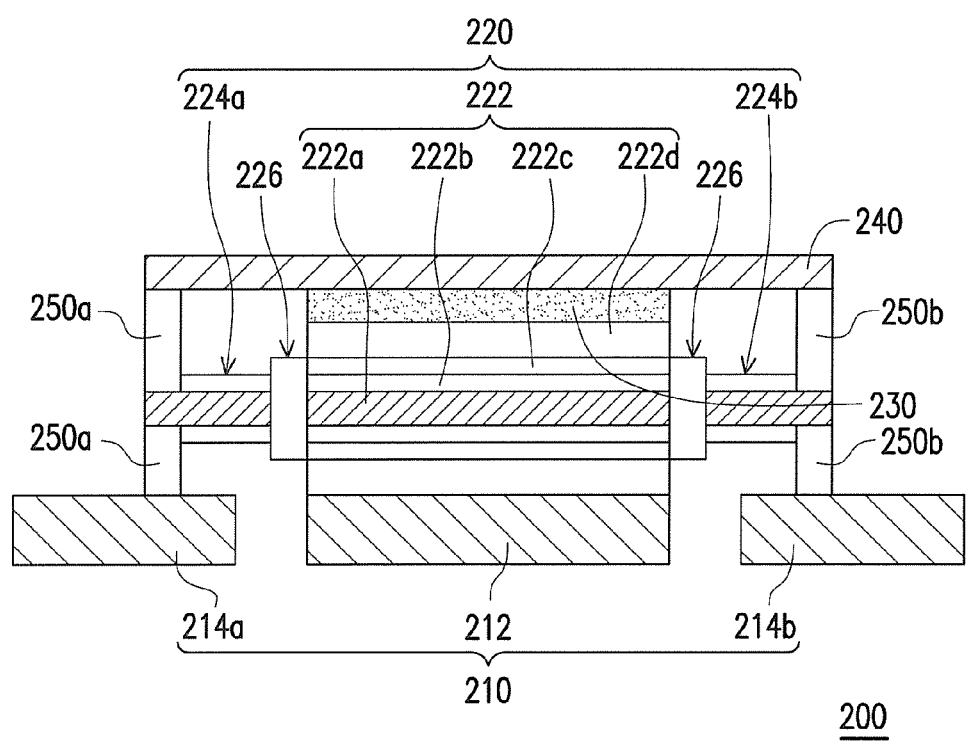
FIG. 3 is a schematic view illustrating a decoupling device according to a second embodiment of the invention.

FIG. 3 is a schematic view illustrating a decoupling device according to a second embodiment of the invention. The decoupling device 200 depicted in FIG. 3 is a three-terminal type decoupling device in which a through-type capacitor unit 220 is applied.

As indicated in FIG. 3, the decoupling device 200 includes a lead frame 210, a capacitor unit 220, a high dielectric organic-inorganic composite material layer 230, and a metal layer 240. The lead frame 210 includes a cathode terminal portion 212, a first anode terminal portion 214a, and a second anode terminal portion 214b. The first anode terminal portion 214a and the second anode terminal portion 214b are located at two sides of the cathode terminal portion 212. The capacitor unit 220 is disposed on the lead frame 210. The capacitor unit 220 includes a cathode portion 222, a first anode portion 224a, and a second anode portion 224b. The first anode portion 224a and the second anode portion 224b are located at two sides of the cathode portion 222. The first anode portion 224a is electrically connected to the first anode terminal portion 214a, the second anode portion 224b is electrically connected to the second anode terminal portion 214b, and the cathode portion 222 is electrically connected to the cathode terminal portion 212. The high dielectric organic-inorganic composite material layer 230 is disposed on the cathode portion 222. Here, the high dielectric organic-inorganic composite material layer 230 is connected to the capacitor unit 220 in parallel via the metal layer 240.

A material of the high dielectric organic-inorganic composite material layer 230, a thickness thereof, and a dielectric constant thereof are similar to those of the high dielectric organic-inorganic composite material layer 130 described in the first embodiment. Besides, the capacitor unit 220 can include an insulation portion 226 respectively located between the first anode portion 224a and the cathode portion 222 and between the second anode portion 224b and the cathode portion 222. The cathode portion 222 of the capacitor unit 220 can include a valve metal layer 222a, a dielectric layer 222b, a solid electrolyte layer 222c, and a conductive layer 222d. The repetitive descriptions are omitted herein.

As indicated in FIG. 3, the metal layer 240 is disposed on the high dielectric organic-inorganic composite material layer 230. The metal layer 240 not only connects the capacitor unit 220 to the high dielectric organic-inorganic composite material layer 230 in parallel but also acts as an electromagnetic shielding layer of the decoupling device 200 for reducing external electromagnetic interference.

In addition, the decoupling device 200 can further include a first spacer 250a and a second spacer 250b. The first spacer 250a is disposed between the first anode portion 224a of the capacitor unit 220 and the metal layer 240 and between the first anode portion 224a of the capacitor unit 220 and the first anode terminal portion 214a. The second spacer 250b is disposed between the second anode portion 224b of the capacitor unit 220 and the metal layer 240 and between the second anode portion 224b of the capacitor unit 220 and the second anode terminal portion 214b. The first and the second spacers 250a and 250b can stabilize the decoupling device 200.

Based on the design demands, the first and the second spacers 250a and 250b can be made of a conductive material or an insulation material. When the first and the second spacers 250a and 250b are made of the conductive material, the first anode terminal portion 214a, the first spacer 250a, the metal layer 240, the second spacer 250b, and the second anode terminal portion 214b are electrically connected to one another, so as to form a conductive channel. Thereby, the conductive channel in the decoupling device 200 can form an inductor during the high frequency operation. An LC circuit can be further formed by the conductive channel and the capacitor unit 220, so as to achieve high frequency filtering.

Third Embodiment

Figure 4:
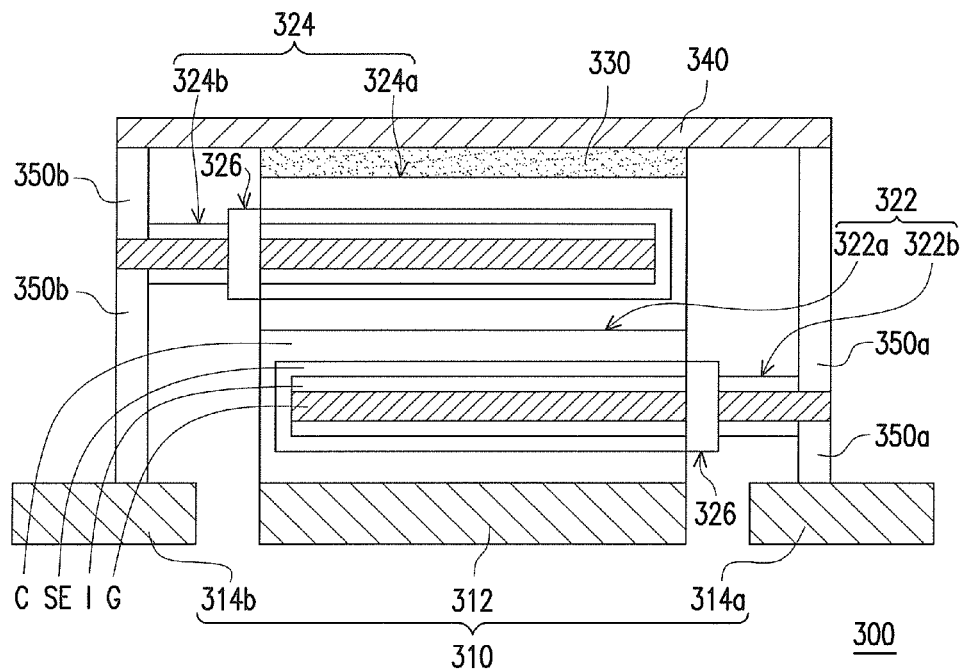
FIG. 4 is a schematic view illustrating a decoupling device according to a third embodiment of the invention.

FIG. 4 is a schematic view illustrating a decoupling device according to a third embodiment of the invention. The decoupling device 300 depicted in FIG. 4 is a three-terminal type decoupling device in which a stacked-type capacitor unit 320 is applied.

As indicated in FIG. 4, the decoupling device 300 includes a lead frame 310, a first capacitor unit 322, a second capacitor unit 324, a high dielectric organic-inorganic composite material layer 330, and a metal layer 340. The lead frame 310 includes a cathode terminal portion 312, a first anode terminal portion 314a, and a second anode terminal portion 314b. The first anode terminal portion 314a and the second anode terminal portion 314b are located at two sides of the cathode terminal portion 312. The first capacitor unit 332 is disposed on the lead frame 310. The first capacitor unit 322 includes a first cathode portion 322a and a first anode portion 322b. The first anode portion 322b is electrically connected to the first anode terminal portion 314a, and the first cathode portion 322a is electrically connected to the cathode terminal portion 312. The second capacitor unit 324 is disposed on the first capacitor unit 322. The second capacitor unit 324 includes a second cathode portion 324a and a second anode portion 324b. The second anode portion 324b is electrically connected to the second anode terminal portion 314b, and the second cathode portion 324a is electrically connected to the first cathode portion 322a. The high dielectric organic-inorganic composite material layer 330 is connected to the first capacitor unit 322 and the second capacitor unit 324 in parallel via the metal layer 340.

The high dielectric organic-inorganic composite material layer 330 can be disposed on the second cathode portion 324a. A material of the high dielectric organic-inorganic composite material layer 330, a thickness thereof, and a dielectric constant thereof are similar to those of the high dielectric organic-inorganic composite material layer 130 described in the first embodiment. Besides, the first capacitor unit 322 and the second capacitor unit 324 can include an insulation portion 326 respectively located between the first anode portion 322b and the first cathode portion 322a and between the second anode portion 324b and the second cathode portion 324a. The first cathode portion 322a of the first capacitor unit 322 or the second cathode portion 324a of the second capacitor unit 324 can include a valve metal layer G, a dielectric layer I, a solid electrolyte layer SE, and a conductive layer C. The repetitive descriptions are omitted herein.

As indicated in FIG. 4, the metal layer 340 can be disposed on the high dielectric organic-inorganic composite material layer 330. Through the metal layer 340, the first and the second capacitor units 322 and 324 and the high dielectric organic-inorganic composite material layer 330 are connected in parallel. The decoupling device 300 formed thereby has the high frequency LC filtering function. Meanwhile, the metal layer 340 can serve as an electromagnetic shielding layer of the decoupling device 300 for reducing the external electromagnetic interference.

Besides, the decoupling device 300 can include a first spacer 350a and a second spacer 350b. The first spacer 350a is disposed between the first anode portion 322b of the first capacitor unit 322 and the metal layer 340 and between the first anode portion 322b of the first capacitor unit 322 and the first anode terminal portion 314a. The second spacer 350b is disposed between the second anode portion 324b of the second capacitor unit 324 and the metal layer 340 and between the second anode portion 324b of the second capacitor unit 324 and the second anode terminal portion 314b.

Similarly, when the first and the second spacers 350a and 350b are made of the conductive material, the first anode terminal portion 314a, the first spacer 350a, the metal layer 340, the second spacer 350b, and the second anode terminal portion 314b are electrically connected to one another, so as to form a conductive channel. Thereby, the conductive channel in the decoupling device 300 can form an inductor during the high frequency operation. An LC circuit can be further formed by the conductive channel and the first and the second capacitor units 322 and 324, so as to achieve high frequency filtering.

Figure 5:
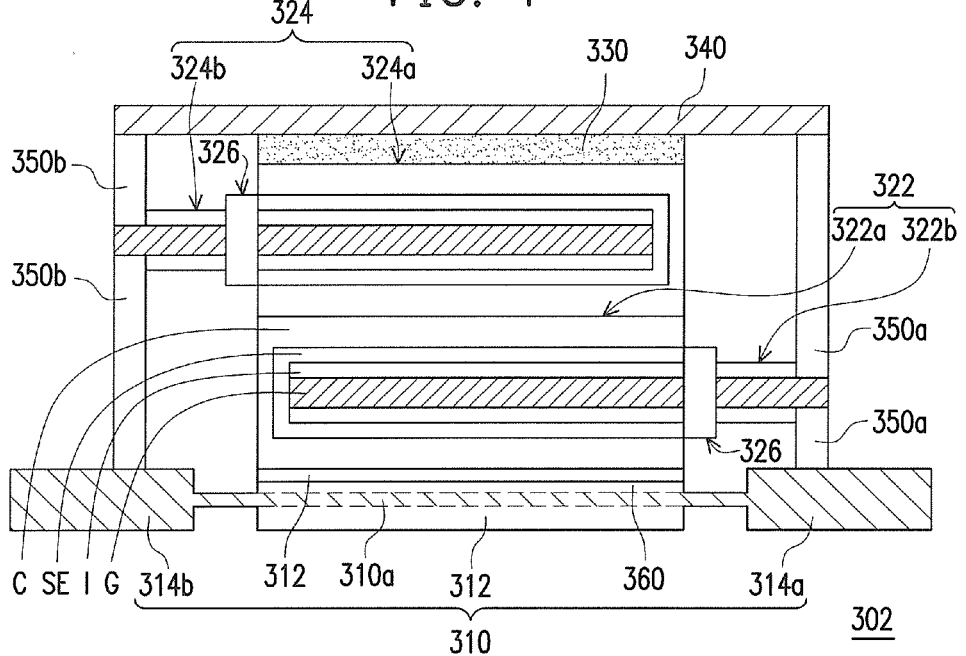
FIG. 5 is a schematic view illustrating another decoupling device according to the third embodiment of the invention.

FIG. 5 is a schematic view illustrating another decoupling device according to the third embodiment of the invention. The decoupling device 302 depicted in FIG. 5 is similar to the decoupling device 300 depicted in FIG. 4. Hence, same components of the decoupling device 302 and the decoupling device 300 are labeled by the same reference numbers, and no further descriptions are provided herein.

As shown in FIG. 5, the decoupling device 302 includes, in addition to the metal layer 340, a conductive line 310a (depicted by dotted lines) connecting the first anode terminal portion 314a and the second anode terminal portion 314b. The conductive line 310a is disposed in an inner space formed by the cathode terminal portion 312, as indicated in FIG. 6B and FIG. 6C. The conductive line 310a is electrically insulated from the cathode terminal portion 312 by an insulation layer 360 disposed between the conductive line 310a and the cathode terminal portion 312, for example.

As shown in FIG. 5, in addition to the conductive channel formed by the first anode terminal portion 314a, the first spacer 350a, the metal layer 340, the second spacer 350b, and the second anode terminal portion 314b, another conductive channel can be formed by the first anode terminal portion 314a, the conductive line 310a, and the second anode terminal portion 314b.

Through the metal layer 340, the first and the second capacitor units 322 and 324 and the high dielectric organic-inorganic composite material layer 330 in the decoupling device 302 depicted in FIG. 5 are connected in parallel. Thereby, the conductive channel in the decoupling device 302 can form an inductor during the high frequency operation. An LC circuit can be further formed by the conductive channel and the first and the second capacitor units 322 and 324, so as to achieve high frequency filtering.

Figure 6A:
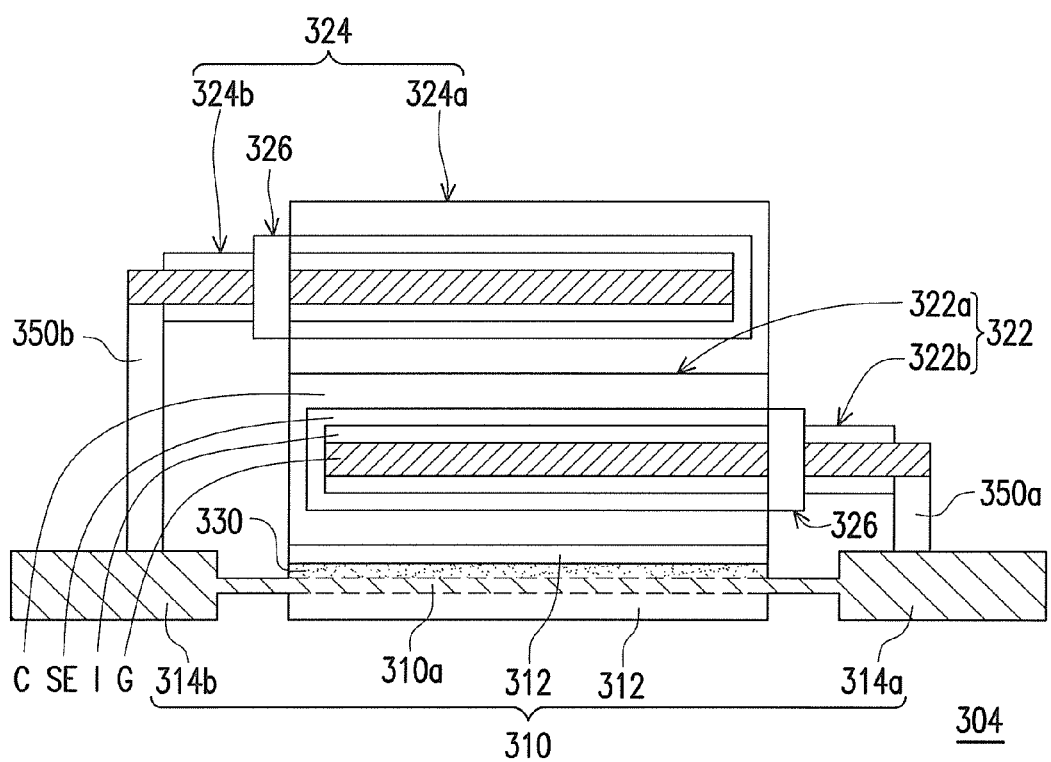
FIG. 6A is a schematic view illustrating still another decoupling device according to the third embodiment of the invention.
Figure 6B:
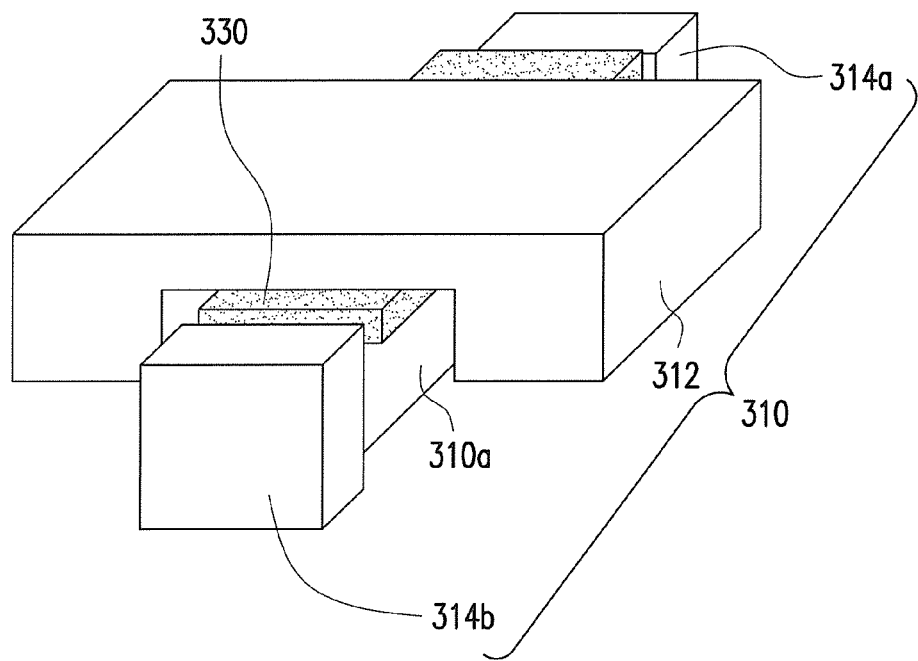
FIG. 6B and FIG. 6C are schematic three-dimensional exploded views illustrating the decoupling device depicted in FIG. 6A.
Figure 6C:
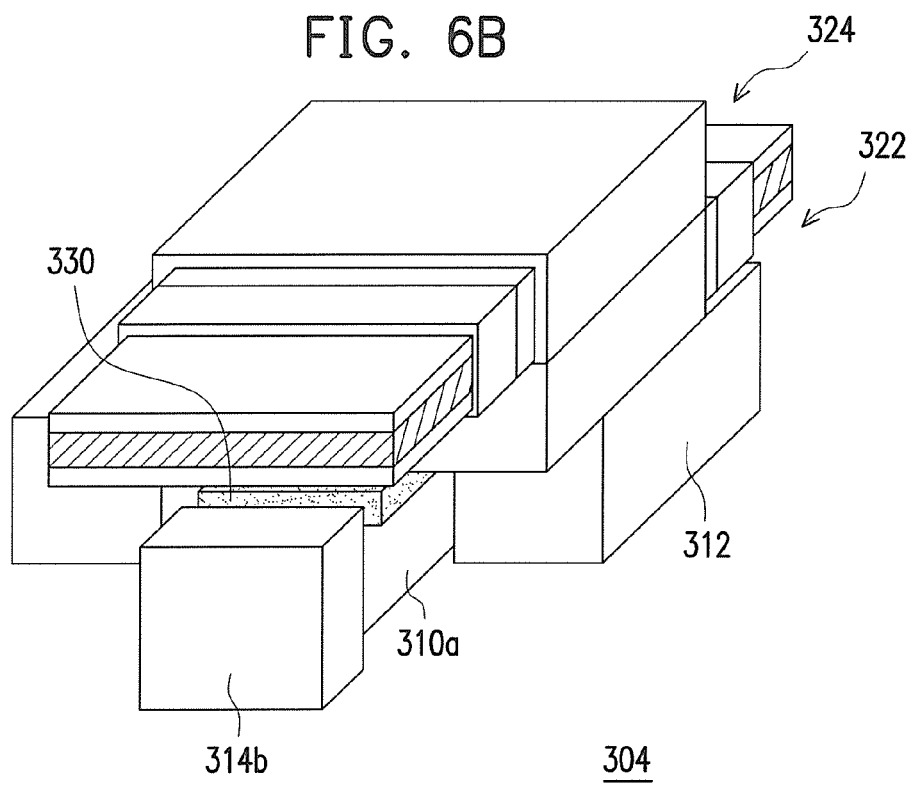

FIG. 6A is a schematic view illustrating still another decoupling device according to the third embodiment of the invention. The decoupling device 304 depicted in FIG. 6A is similar to the decoupling device 302 depicted in FIG. 5, and same components of the decoupling device 304 and the decoupling device 302 are labeled by the same reference numbers. In the decoupling device 304, the metal layer 340 is replaced by the conductive line 310a. Namely, the high dielectric organic-inorganic composite material layer 330 is coated between the conductive line 310a and the cathode terminal portion 312 (depicted in a lower portion of FIG. 6A), such that the first and the second capacitor units 322 and 324 and the high dielectric organic-inorganic composite material layer 330 are connected in parallel.

The cathode terminal portion 312 and the conductive line 310a are electrically insulated from each other by the high dielectric organic-inorganic composite material layer 330, and high capacitance can be generated during the high frequency operation. Besides, in the decoupling device 304, the conductive channel formed by the conductive line 310a can form an inductor during the high frequency operation. A π-type circuit (a CLC circuit) can be accordingly formed by the first and the second capacitor units 322 and 324, the conductive channel, and the high dielectric organic-inorganic composite material layer 330, so as to achieve high frequency filtering.

FIG. 6B and FIG. 6C are schematic three-dimensional exploded views illustrating the decoupling device depicted in FIG. 6A. With reference to FIG. 6A~FIG. 6C, the lead frame 310 (i.e. the cathode terminal portion 312, the first anode terminal portion 314a, and the second anode terminal portion 314b), the conductive line 310a, and the high dielectric organic-inorganic composite material layer 330 are depicted in FIG. 6B. The first capacitor unit 322 and the second capacitor unit 324 are sequentially stacked on an upper side of the conductive line 310a as indicated in FIG. 6C, so as to form the decoupling device 304.

According to FIG. 6A~FIG. 6C, the decoupling device 304 can have no metal layer 340 but have the conductive line 310a connecting the first anode terminal portion 314a and the second anode terminal portion 314b. The conductive line 310a is disposed in an inner space formed by the cathode terminal portion 312. The high dielectric organic-inorganic composite material layer 330 is directly disposed on the conductive line 310a. The cathode terminal portion 312 is disposed on the high dielectric organic-inorganic composite material layer 330. The first capacitor unit 322 and the second capacitor unit 324 are stacked on the cathode terminal portion 312. The conductive line 310a passes through the inner space formed by the cathode terminal portion 312, and the high dielectric organic-inorganic composite material layer 330 is sandwiched between the conductive line 310a and the cathode terminal portion 312.

The structure of the decoupling device 304 as illustrated in FIG. 6A~FIG. 6C is rather simple. The high dielectric organic-inorganic composite material layer 330 not only can prevent short circuits between the conductive line 310a and the cathode terminal portion 312 but can provide high capacitance. Thereby, the decoupling device 304 can have the electrical properties of regulated voltages (caused by the capacitance provided by the first and the second capacitor units 322 and 324) and high frequency filters (caused by the capacitance provided by the high dielectric organic-inorganic composite material layer 330).

The novel decoupling devices 100, 102, 200, 300, 302, and 304 depicted in FIG. 1~FIG. 6C have small sizes, simple structures, and the electrical properties of regulated voltages and high frequency filters.

On the other hand, based on different design demands, at least one layer or multiple layers of the capacitor units 120, 220, 322, and 324 can be stacked in the decoupling devices 100, 102, 200, 300, 302, and 304, such that the decoupling devices 100, 102, 200, 300, 302, and 304 can have different capacitance. The invention is not limited to stacking only one layer of the capacitor units 120, 220, 322, and 324.

In light of the foregoing, the decoupling device of the invention has at least the following advantages.

In the invention, the high dielectric organic-inorganic composite material layer is integrated into the solid electrolyte capacitor, so as to form a novel decoupling device. Multiple layers of capacitor units can be stacked in the decoupling device based on different design demands. The decoupling device is not only characterized by the small size and the simple structure but also by the electrical properties of regulated voltages and high frequency filters.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A decoupling device comprising:
   a lead frame comprising a cathode terminal portion and an anode terminal portion;
   a capacitor unit disposed on the lead frame, the capacitor unit comprising a cathode portion, an anode portion, and an insulation portion located between the cathode portion and the anode portion, wherein the cathode portion is electrically connected to the cathode terminal portion, and the anode portion is electrically connected to the anode terminal portion;
   a metal layer; and
   a high dielectric organic-inorganic composite material layer connected to the capacitor unit in parallel via the metal layer.

2. The decoupling device as claimed in claim 1, wherein the capacitor unit and the high dielectric organic-inorganic composite material layer are disposed at a same side of the cathode terminal portion, the cathode portion of the capacitor unit is disposed on the cathode terminal portion, and the high dielectric organic-inorganic composite material layer is disposed on the cathode portion of the capacitor unit.

3. The decoupling device as claimed in claim 1, further comprising a spacer disposed between the anode portion of the capacitor unit and the metal layer and between the anode portion of the capacitor unit and the anode terminal portion.

4. The decoupling device as claimed in claim 1, wherein the capacitor unit and the high dielectric organic-inorganic composite material layer are disposed at two opposite sides of the cathode terminal portion, the cathode portion of the capacitor unit is disposed at one of the two sides of the cathode terminal portion, and the high dielectric organic-inorganic composite material layer is disposed at the other one of the two sides of the cathode terminal portion.

5. The decoupling device as claimed in claim 4, wherein the metal layer is disposed on the high dielectric organic-inorganic composite material layer.

6. The decoupling device as claimed in claim 4, further comprising a spacer disposed between the anode portion of the capacitor unit and the metal layer and between the anode portion of the capacitor unit and the anode terminal portion.

7. The decoupling device as claimed in claim 1, wherein a thickness of the high dielectric organic-inorganic composite material layer ranges from 10 nm to 10 μM.

8. The decoupling device as claimed in claim 1, wherein a material of the high dielectric organic-inorganic composite material layer is a mixture of a ceramic material and a polymer material.

9. The decoupling device as claimed in claim 8, wherein the material of the high dielectric organic-inorganic composite material layer further comprises a conductive material.

10. The decoupling device as claimed in claim 9, the ceramic material comprising barium titanate, zirconium titanate, strontium titanate, lead zirconium titanate, barium strontium titanium zirconium ceramics, or a combination thereof;
   the polymer material comprising epoxy resin, polyacrylic acid, polyimide, polyetherimide, or a combination thereof; and
   the conductive material comprising carbon black, natural graphite, artificial graphite, silver powder, carbon fiber, or a combination thereof.

11. The decoupling device as claimed in claim 1, wherein a dielectric constant of the high dielectric organic-inorganic composite material layer ranges from 10 to 2,000 at a frequency of 1 MHz.

12. The decoupling device as claimed in claim 1, the cathode portion comprising:
   a valve metal layer;
   a dielectric layer formed on the valve metal layer;
   a solid electrolyte layer formed on the dielectric layer; and
   a conductive layer formed on the solid electrolyte layer.

13. The decoupling device as claimed in claim 12, wherein a material of the valve metal layer is selected from aluminum, tantalum, titanium, niobium, and an alloy thereof.

14. A decoupling device comprising:
a lead frame comprising a cathode terminal portion, a first anode terminal portion, and a second anode terminal portion, the first anode terminal portion and the second anode terminal portion being located at two sides of the cathode terminal portion;
a capacitor unit disposed on the lead frame, the capacitor unit comprising a cathode portion, a first anode portion, and a second anode portion, the first anode portion and the second anode portion being located at two sides of the cathode portion, wherein the first anode portion is electrically connected to the first anode terminal portion, the second anode portion is electrically connected to the second anode terminal portion, and the cathode portion is electrically connected to the cathode terminal portion;
a metal layer; and
a high dielectric organic-inorganic composite material layer disposed on the cathode portion, wherein the high dielectric organic-inorganic composite material layer is connected to the capacitor unit in parallel via the metal layer.

15. The decoupling device as claimed in claim 14, wherein the metal layer is disposed on the high dielectric organic-inorganic composite material layer.

16. The decoupling device as claimed in claim 15, further comprising:
a first spacer disposed between the first anode portion of the capacitor unit and the metal layer and between the first anode portion of the capacitor unit and the first anode terminal portion; and
a second spacer disposed between the second anode portion of the capacitor unit and the metal layer and between the second anode portion of the capacitor unit and the second anode terminal portion.

17. The decoupling device as claimed in claim 16, wherein the first anode terminal portion, the first spacer, the metal layer, the second spacer, and the second anode terminal portion are electrically connected to one another.

18. The decoupling device as claimed in claim 14, wherein a thickness of the high dielectric organic-inorganic composite material layer ranges from 10 nm to 10 µm.

19. The decoupling device as claimed in claim 14, wherein a material of the high dielectric organic-inorganic composite material layer is a mixture of a ceramic material and a polymer material.

20. The decoupling device as claimed in claim 19, wherein the material of the high dielectric organic-inorganic composite material layer further comprises a conductive material.

21. The decoupling device as claimed in claim 20, the ceramic material comprising barium titanate, zirconium titanate, strontium titanate, lead zirconium titanate, barium strontium titanium zirconium ceramics, or a combination thereof;
the polymer material comprising epoxy resin, polyacrylic acid, polyimide, polyetherimide, or a combination thereof; and
the conductive material comprising carbon black, natural graphite, artificial graphite, silver powder, carbon fiber, or a combination thereof.

22. The decoupling device as claimed in claim 14, wherein a dielectric constant of the high dielectric organic-inorganic composite material layer ranges from 10 to 2,000 at a frequency of 1 MHz.

23. The decoupling device as claimed in claim 14, the cathode portion comprising:
a valve metal layer;
a dielectric layer formed on the valve metal layer;
a solid electrolyte layer formed on the dielectric layer; and
a conductive layer formed on the solid electrolyte layer.

24. The decoupling device as claimed in claim 23, wherein a material of the valve metal layer is selected from aluminum, tantalum, titanium, niobium, and an alloy thereof.

25. A decoupling device comprising:
a lead frame comprising a cathode terminal portion, a first anode terminal portion, and a second anode terminal portion, the first anode terminal portion and the second anode terminal portion being located at two sides of the cathode terminal portion;
a first capacitor unit disposed on the lead frame, the first capacitor unit comprising a first cathode portion and a first anode portion, wherein the first anode portion is electrically connected to the first anode terminal portion, and the first cathode portion is electrically connected to the cathode terminal portion;
a second capacitor unit disposed on the first capacitor unit, the second capacitor unit comprising a second cathode portion and a second anode portion, wherein the second anode portion is electrically connected to the second anode terminal portion, and the second cathode portion is electrically connected to the first cathode portion; and
a high dielectric organic-inorganic composite material layer connected to the first capacitor unit and the second capacitor unit in parallel.

26. The decoupling device as claimed in claim 25, wherein the high dielectric organic-inorganic composite material layer is disposed on the second cathode portion.

27. The decoupling device as claimed in claim 26, further comprising a metal layer disposed on the high dielectric organic-inorganic composite material layer.

28. The decoupling device as claimed in claim 27, further comprising:
a first spacer disposed between the first anode portion of the first capacitor unit and the metal layer and between the first anode portion of the first capacitor unit and the first anode terminal portion; and
a second spacer disposed between the second anode portion of the second capacitor unit and the metal layer and between the second anode portion of the second capacitor unit and the second anode terminal portion.

29. The decoupling device as claimed in claim 28, wherein the first anode terminal portion, the first spacer, the metal layer, the second spacer, and the second anode terminal portion are electrically connected to one another.

30. The decoupling device as claimed in claim 27, further comprising a conductive line connecting the first anode terminal portion and the second anode terminal portion, the conductive line being disposed in an inner space formed by the cathode terminal portion and electrically insulated from the cathode terminal portion.

31. The decoupling device as claimed in claim 25, further comprising a conductive line connecting the first anode terminal portion and the second anode terminal portion, the conductive line being disposed in an inner space formed by the cathode terminal portion and electrically insulated from the cathode terminal portion, the high dielectric organic-inorganic composite material layer being disposed on the conductive line, the cathode terminal portion being disposed on the high dielectric organic-inorganic composite material layer, the first capacitor unit and the second capacitor unit being stacked on the cathode terminal portion.

32. The decoupling device as claimed in claim 25, wherein a thickness of the high dielectric organic-inorganic composite material layer ranges from 10 nm to 10 µm.

33. The decoupling device as claimed in claim 25, wherein a material of the high dielectric organic-inorganic composite material layer is a mixture of a ceramic material and a polymer material.

34. The decoupling device as claimed in claim 33, wherein the material of the high dielectric organic-inorganic composite material layer further comprises a conductive material.

35. The decoupling device as claimed in claim 34, the ceramic material comprising barium titanate, zirconium titanate, strontium titanate, lead zirconium titanate, barium strontium titanium zirconium ceramics, or a combination thereof;
the polymer material comprising epoxy resin, polyacrylic acid, polyimide, polyetherimide, or a combination thereof; and
the conductive material comprising carbon black, natural graphite, artificial graphite, silver powder, carbon fiber, or a combination thereof.

36. The decoupling device as claimed in claim 25, wherein a dielectric constant of the high dielectric organic-inorganic composite material layer ranges from 10 to 2,000 at a frequency of 1 MHz.

37. The decoupling device as claimed in claim 25, the cathode portion comprising:
a valve metal layer;
a dielectric layer formed on the valve metal layer;
a solid electrolyte layer formed on the dielectric layer; and
a conductive layer formed on the solid electrolyte layer.

38. The decoupling device as claimed in claim 37, wherein a material of the valve metal layer is selected from aluminum, tantalum, titanium, niobium and an alloy thereof.

* * * * *